US008028024B2

(12) United States Patent
Krishnan

(10) Patent No.: US 8,028,024 B2
(45) Date of Patent: Sep. 27, 2011

(54) SYSTEM AND METHOD OF INSTANT MESSAGING BETWEEN WIRELESS DEVICES

(75) Inventor: Ranganathan Krishnan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1058 days.

(21) Appl. No.: 11/361,260

(22) Filed: Feb. 24, 2006

(65) Prior Publication Data

US 2007/0203986 A1 Aug. 30, 2007

(51) Int. Cl.
*G06F 15/16* (2006.01)
*H04M 3/00* (2006.01)

(52) U.S. Cl. .................................... 709/206; 455/420

(58) Field of Classification Search ............ 455/421, 455/452.2, 456.2, 466, 420; 709/206, 219, 709/232, 207, 224; 370/454
See application file for complete search history.

(56) References Cited

U.S. PATENT DOCUMENTS

| | | | | |
|---|---|---|---|---|
| 5,203,013 A * | 4/1993 | Breeden et al. | ........... | 455/434 |
| 5,732,347 A * | 3/1998 | Bartle et al. | ........... | 455/421 |
| 5,787,357 A * | 7/1998 | Salin | ........... | 455/466 |
| 6,480,712 B1 * | 11/2002 | Vigil | ........... | 455/412.2 |
| 6,839,560 B1 * | 1/2005 | Bahl et al. | ........... | 455/456.1 |
| 7,072,641 B2 | 7/2006 | Satapathy | | |
| 7,076,245 B1 * | 7/2006 | Satapathy | ........... | 455/421 |
| 7,103,806 B1 * | 9/2006 | Horvitz | ........... | 714/43 |
| 7,130,620 B2 | 10/2006 | Forman et al. | | |
| 7,130,667 B2 | 10/2006 | Jin et al. | | |
| 7,221,951 B2 | 5/2007 | Anvekar et al. | | |
| 7,236,472 B2 * | 6/2007 | Lazaridis et al. | ........... | 370/328 |
| 7,242,936 B2 | 7/2007 | Huang et al. | | |
| 7,403,786 B2 | 7/2008 | Caspi et al. | | |
| 7,412,263 B2 | 8/2008 | Seier | | |
| 2001/0012774 A1 | 8/2001 | Muramatsu | | |
| 2002/0067831 A1 * | 6/2002 | Zhu et al. | ........... | 380/272 |
| 2003/0054844 A1 * | 3/2003 | Anvekar et al. | ........... | 455/466 |
| 2004/0184452 A1 | 9/2004 | Huotari et al. | | |

(Continued)

FOREIGN PATENT DOCUMENTS

WO    WO03090412    10/2003

(Continued)

OTHER PUBLICATIONS

International Search Report—PCT/US07/062828, International Searching Authority—European Patent Office, Jul. 20, 2007.

(Continued)

*Primary Examiner* — Joshua Joo
*Assistant Examiner* — Jonathan Willis
(74) *Attorney, Agent, or Firm* — Robert J. O'Connell; Raphael Freiwirth

(57) ABSTRACT

A system and method of instant messaging is disclosed and includes transmitting an indication from a wireless device to an instant messaging server that instant messaging is enabled at the wireless device. Further, a plurality of communication signals between the wireless device and a plurality of base stations are monitored. After determining that the wireless device has one remaining communication signal with one base station, the one remaining communication signal is monitored. Moreover, a time history of signal strength data for the one remaining communication signal is recorded and a slope of the signal strength data is determined. Based on the slope of the signal strength data, it can be determined whether an imminent loss of signal is about to occur at the wireless device.

25 Claims, 11 Drawing Sheets

U.S. PATENT DOCUMENTS

| | | | |
|---|---|---|---|
| 2004/0203607 A1* | 10/2004 | Satapathy | 455/412.1 |
| 2004/0203645 A1* | 10/2004 | Forman et al. | 455/414.1 |
| 2005/0030947 A1* | 2/2005 | Alfano et al. | 370/389 |
| 2005/0059381 A1* | 3/2005 | Hintermeister et al. | 455/412.1 |
| 2005/0070308 A1* | 3/2005 | Caspi et al. | 455/456.3 |
| 2005/0071426 A1* | 3/2005 | Shah | 709/204 |
| 2005/0255893 A1* | 11/2005 | Jin et al. | 455/572 |
| 2005/0288018 A1* | 12/2005 | Huang et al. | 455/436 |
| 2006/0068731 A1* | 3/2006 | Seier | 455/226.2 |
| 2006/0148499 A1* | 7/2006 | Chie | 455/515 |
| 2006/0168037 A1* | 7/2006 | Audu et al. | 709/206 |

FOREIGN PATENT DOCUMENTS

WO  WO2005027369  3/2005

OTHER PUBLICATIONS

Written Opinion—PCT/US07/062828, International Searching Authority—European Patent Office, Jul. 20, 2008.

International Preliminary Report on Patentability—PCT/US07/062828, The International Bureau of WIPO—Geneva, Switzerland, Aug. 26, 2008.

* cited by examiner

SYSTEM AND METHOD OF INSTANT MESSAGING BETWEEN WIRELESS DEVICES

BACKGROUND

I. Field

The present disclosure generally relates to wireless devices. More particularly, the disclosure relates to instant messaging between wireless devices.

II. Description of Related Art

Advances in technology have resulted in smaller and more powerful wireless devices. For example, there currently exist a variety of wireless devices, including mobile phones, personal digital assistants (PDAs), laptops, and paging devices that are small, lightweight, and easily carried by users. These devices may include the ability to transmit voice and/or data over wireless networks. Further, many such wireless devices provide significant computing capabilities, and as such, are becoming tantamount to small personal computers and hand-held PDAs.

Typically, these smaller and more powerful wireless devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such wireless devices.

Some of these wireless devices utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device system hardware and the software applications. As such, the wireless device functionality can be made available to the software applications by allowing the software to make a generic call for a function thus not requiring the developer to tailor its source code to the individual hardware or device on which the software is executing. Further, some APIs can provide mechanisms for secure communications between wireless devices, such as client devices and server systems, using secure cryptographic key information.

Examples of such APIs, some of which are discussed in more detail below, include those currently publicly available versions of the Binary Runtime Environment for Wireless® (BREW®) platform, developed by Qualcomm, Inc. of San Diego, Calif. The BREW® platform can provide one or more interfaces to particular hardware and software features found on wireless devices.

Further, the BREW® platform can be used in an end-to-end software distribution system to provide a variety of benefits for wireless service operators, software developers and wireless device manufacturers and consumers. One such currently available end-to-end software distribution system, called the BREW® solution developed by QUALCOMM Incorporated, includes logic distributed over a server-client architecture, wherein the server can perform billing, security, and application distribution functionality, and wherein the client can perform application execution, security and user interface functionality.

In certain cases, instant messaging applications can be used to establish communication between a first wireless device and a second wireless device. If a wireless device to which an instant message is targeted is not in service, e.g., not within a coverage area provided by one or more base stations, the sending device may only receive an indication that the target device is not responding to the instant message.

Accordingly it would be advantageous to provide an improved system and method of instant messaging between wireless devices.

SUMMARY

A method of instant messaging is disclosed and includes transmitting an indication from a wireless device to an instant messaging server that instant messaging is enabled at the wireless device. Further, the method includes determining that an imminent loss of signal is about to occur at the wireless device.

In a particular embodiment, the method includes monitoring a plurality of communication signals between the wireless device and a plurality of base stations, determining whether the wireless device has one remaining communication signal with one base station, and monitoring the one remaining communication signal. In another particular embodiment, the method further includes recording a time history of signal strength data for the one remaining communication signal, determining a slope of the signal strength data, and based on the slope of the signal strength data, determining whether the imminent loss of signal is about to occur at the wireless device.

In yet another particular embodiment, the method includes transmitting an indication to the instant messaging server that the wireless device is experiencing an imminent loss of signal condition. In still another particular embodiment, the method includes transmitting an indication to the instant messaging server to hold instant messages. Additionally, in a particular embodiment, the method includes monitoring the wireless device for a communication signal and determining when the communication signal is re-acquired.

In another particular embodiment, the method includes transmitting an indication to the instant messaging server that the communication signal is re-acquired. Moreover, in a particular embodiment, the method includes indicating to the instant messaging server to send instant messages that were received while the wireless device was out of communication with the instant messaging server.

In another embodiment, a method of instant messaging is disclosed and includes receiving an instant messaging status message from a first wireless device at an instant messaging server, determining whether instant messaging is enabled at the first wireless device, and determining whether a de-registration message is received from the first wireless device at the instant messaging server. In this embodiment, the de-registration message indicates that the first wireless device is experiencing an imminent loss of signal condition.

In yet another embodiment, a method of instant messaging is disclosed and includes transmitting one or more instant messages from a sending wireless device to a target wireless device via an instant messaging server and receiving an indication at the sending wireless device from the instant messaging server that instant messaging is enabled at the target wireless device, but the target wireless device is out of service.

In another embodiment, a communication system is provided and includes a first wireless device, a second wireless device, and an instant messaging server that is coupled to the first wireless device and the second wireless device. The instant messaging server includes a processor and a computer readable medium that is accessible to the processor. A computer program is embedded within the computer readable medium and includes instructions to receive an instant messaging status message from a first wireless device, instructions to determine whether instant messaging is enabled at the first wireless device, and instructions to determine whether a de-registration message is received from the first wireless device. The de-registration message can indicate that the first wireless device is experiencing an imminent loss of signal condition and that the first wireless device is about to go out of service.

In still another embodiment, a wireless device is disclosed and includes a processor and a computer readable medium that is accessible to the processor. Further, a computer program is embedded within the computer readable medium. The computer program includes instructions to transmit an indication from a wireless device to an instant messaging server that instant messaging is enabled at the wireless device and instructions to transmit an indication of an imminent loss of signal condition.

In yet another embodiment, an instant messaging server is disclosed and includes a processor and a computer readable medium that is accessible to the processor. Moreover, a computer program is embedded within the computer readable medium. The computer program includes instructions to receive an instant messaging status message from a first wireless device, instructions to determine whether instant messaging is enabled at the first wireless device, and instructions to determine whether a de-registration message is received from the first wireless device. The de-registration message can indicate that the first wireless device is experiencing an imminent loss of signal condition.

In still yet another embodiment, a wireless device is disclosed and includes a processor and a computer readable medium that is accessible to the processor. A computer program is embedded within the computer readable medium and includes instructions to transmit one or more instant messages from to a target wireless device via an instant messaging server and instructions to receive an indication from the instant messaging server that instant messaging is enabled at the target wireless device, but the target wireless device is out of service.

In another embodiment, a computer program is embedded within a computer readable medium and includes instructions to receive an instant messaging status message from a first wireless device at an instant messaging server, instructions to determine whether instant messaging is enabled at the first wireless device, and instructions to determine whether a de-registration message is received from the first wireless device at the instant messaging server. The de-registration message can indicate that the first wireless device is experiencing an imminent loss of signal condition.

In still another embodiment, a computer program is embedded within a computer readable medium and includes instructions to transmit an indication from a wireless device to an instant messaging server that instant messaging is enabled at the wireless device, and instructions to determine that an imminent loss of signal is about to occur at the wireless device.

In another embodiment, a computer program is embedded within a computer readable medium and includes instructions to transmit one or more instant messages from a sending wireless device to a target wireless device via an instant messaging server, and instructions to receive an indication at the sending wireless device from the instant messaging server that instant messaging is enabled at the target wireless device, but the target wireless device is out of service.

In yet another embodiment, an instant messaging server is disclosed and includes means for receiving an instant messaging status message from a first wireless device at an instant messaging server, means for determining whether instant messaging is enabled at the first wireless device, and means for determining whether a de-registration message is received from the first wireless device at the instant messaging server. The de-registration message can indicate that the first wireless device is experiencing an imminent loss of signal and the first wireless device is about to go out of service.

In still another embodiment, a wireless device is disclosed and includes means for transmitting an indication from a wireless device to an instant messaging server that instant messaging is enabled at the wireless device and means for determining that an imminent loss of signal is about to occur at the wireless device.

In another embodiment, a wireless device is disclosed and includes means for transmitting one or more instant messages from a sending wireless device to a target wireless device via an instant messaging server and means for receiving an indication from the instant messaging server that instant messaging is enabled at the target wireless device, but the target wireless device is out of service.

An advantage of one or more of embodiments disclosed herein can include indicating to an instant messaging server that a wireless device is about to lose service.

Another advantage can include holding instant messages at an instant messaging server for a wireless device that has lost service.

Still another advantage can include indicating to a sending wireless device that a target wireless device has instant messaging enabled, but has lost service.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a wireless device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action. The following detailed description describes methods, systems, software and apparatus used in connection with one or more wireless devices.

In one or more embodiments, a wireless device may utilize a runtime environment, such as a version of the Binary Runtime Environment for Wireless® (BREW®) platform developed by QUALCOMM, Inc., of San Diego, Calif. In at least one embodiment in the following description, the system used to provide communications between wireless devices and servers is implemented on a wireless device executing a runtime environment, such as the current version of the BREW® platform. However, one or more embodiments of the system used to provide communications between wireless devices and servers are suitable for use with other types of runtime environments that, for example, operate to control the execution of applications on wireless devices.

Figure 1:
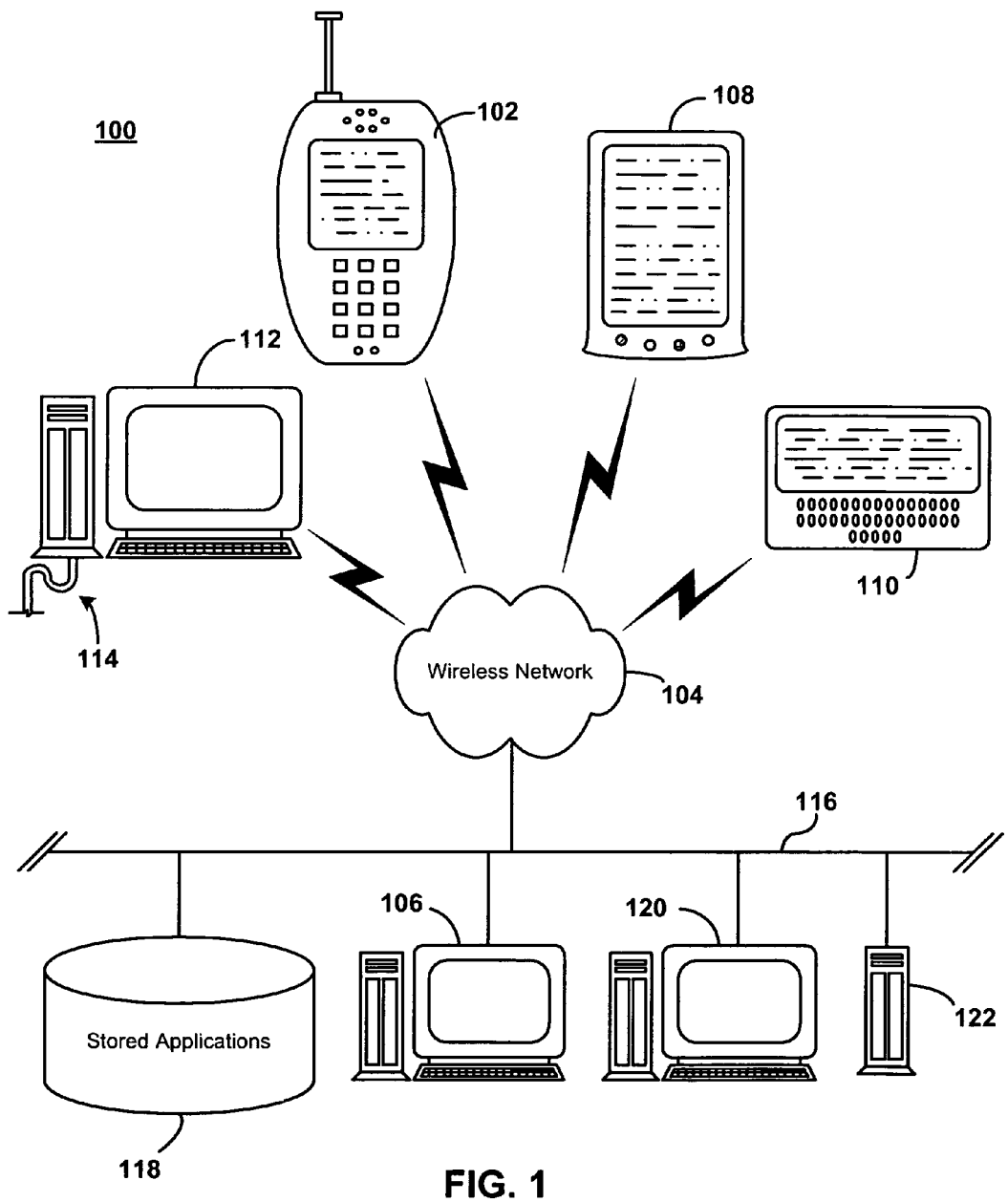
FIG. 1 is a general diagram of a particular embodiment of a system providing communications between a wireless device and a server.

FIG. 1 illustrates a block diagram of an exemplary, non-limiting embodiment of a system 100 that may perform loading, reloading, and deletion of software application components on a wireless device, such as wireless telephone 102. The wireless telephone 102 communicates across a wireless network 104 with at least one application server 106. Further, the application server 106 can selectively transmit one or more software applications and components to one or more wireless devices across a wireless communication portal or other node having data access to the wireless network 104.

As illustrated in FIG. 1, the wireless device can be a wireless telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes a second server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that are downloadable by the wireless devices 102, 108, 110, 112. Different embodiments are contemplated that locate logic to perform secure communications at any one or more of the application download server 106, the second server 120 and the stand-alone server 122.

Figure 2:
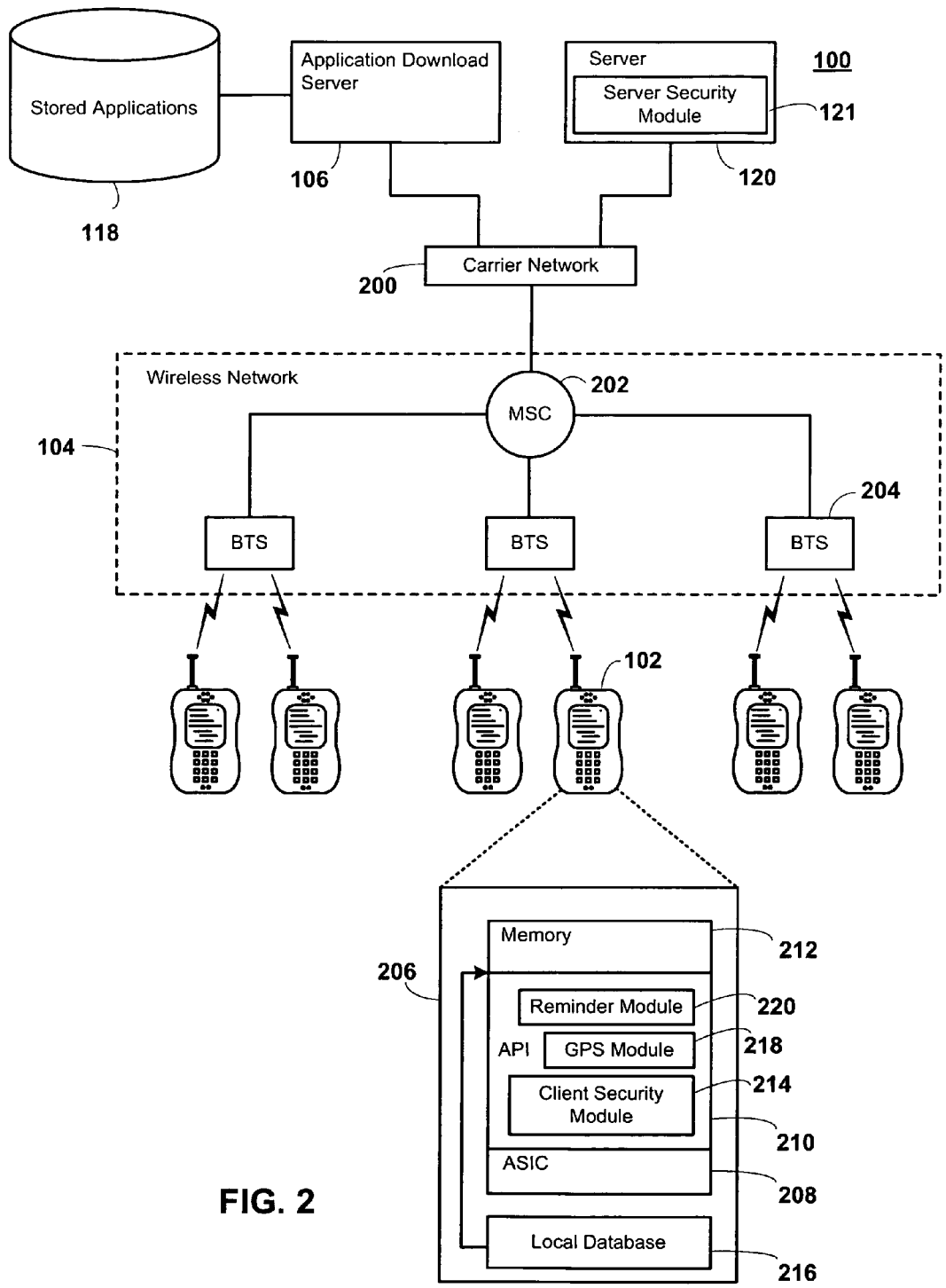
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a wireless device, such as wireless devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS network transfers voice information. The MSC 202 is connected to multiple base transceiver stations ("BTS") 204. The MSC 202 can be connected to the BTS 204 by both a data network for data transfer and POTS for voice information. The BTS 204 ultimately broadcasts messages wirelessly to the wireless devices, such as to wireless telephone 102, by the short messaging service ("SMS"), or other over-the-air methods known in the art.

The wireless device 102 has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture of the wireless device. The ASIC 208 or other processor can execute an application programming interface ("API") 210 layer that interfaces with resident programs in the memory 212 of the wireless device. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk.

A wireless device, e.g., the wireless device 102, can download one or more software applications, such as games, news, stock monitors, and the like, from the application download server 106. Further, the wireless device 102 can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 121. As shown in FIG. 2, the API 210 can also include a global positioning system (GPS) module 218 and a reminder module 220.

Figure 3:
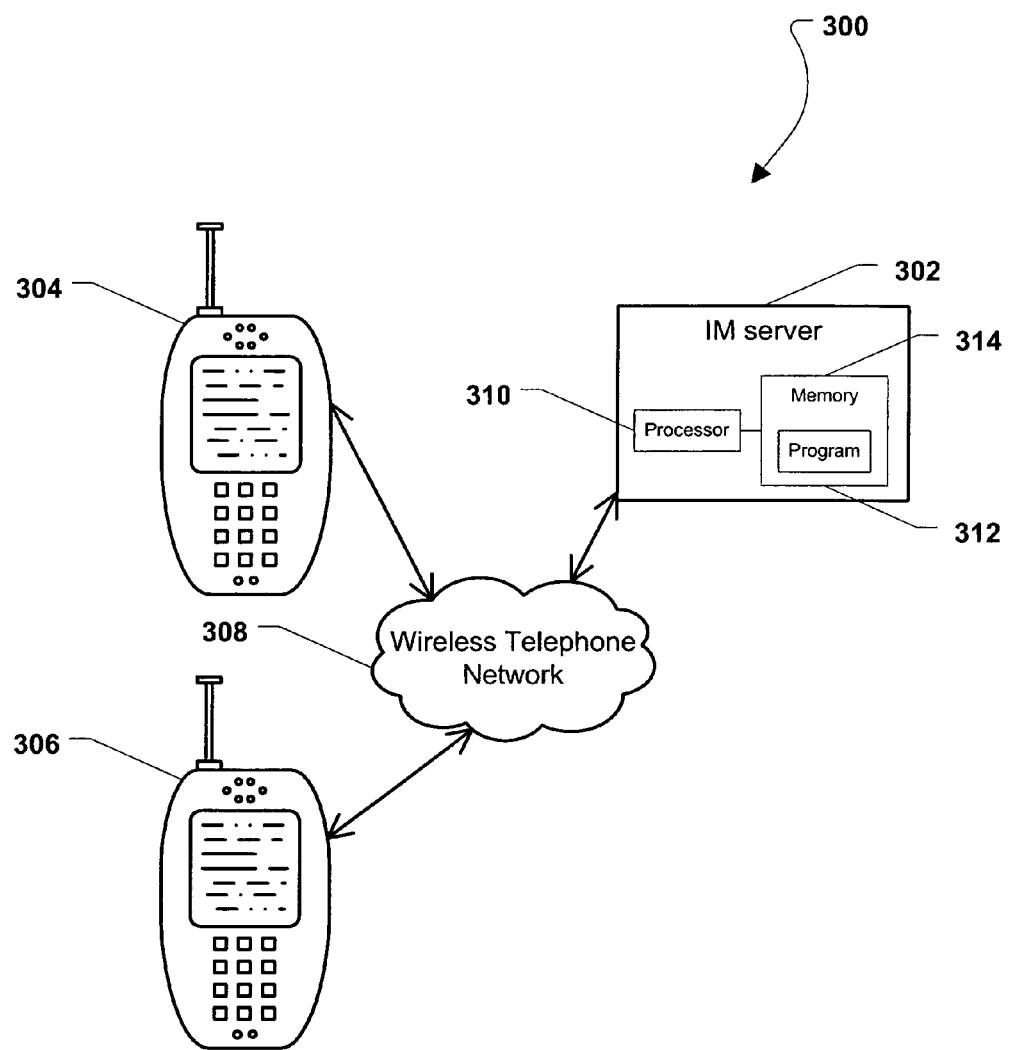
FIG. 3 is a general diagram of an instant messaging system.

FIG. 3 depicts an instant messaging system, generally designated 300. As illustrated, the system 300 includes an instant messaging server 302. Additionally, as shown in FIG. 3, a first wireless device 304 and a second wireless device 306 can communicate with the instant messaging server 302 and each other via a wireless telephone network 308. In a particular embodiment, the wireless devices 304, 306 are the wireless devices 102, described above in conjunction with FIG. 1. Additionally, in a particular embodiment, the wireless devices 304, 306 can include a program for sending and receiving instants messages to each other via the instant messaging server 302.

In a particular embodiment, each wireless device 304, 306 can include a program for determining when each wireless device 304, 306 is about to lose communication with the wireless telephone network 308 and as such, be unable to receive instant messages. When either wireless device 304, 306 is about to experience an imminent loss of coverage, the wireless device 304, 306 can indicate to the instant messaging server 302 to hold instant messages to the wireless devices 304, 306 at the instant messaging server 302.

In a particular embodiment, the first wireless device 304 and the second wireless device 306 can be a wireless telephone, a cellular telephone, a lap top computer, a desktop computer, a handheld computer, a portable digital assistant (PDA), or any other electronic device that is configured to communicate via wireless connection or a wired connection. Further, the programs can operate using the BREW® platform described above.

Figure 4:
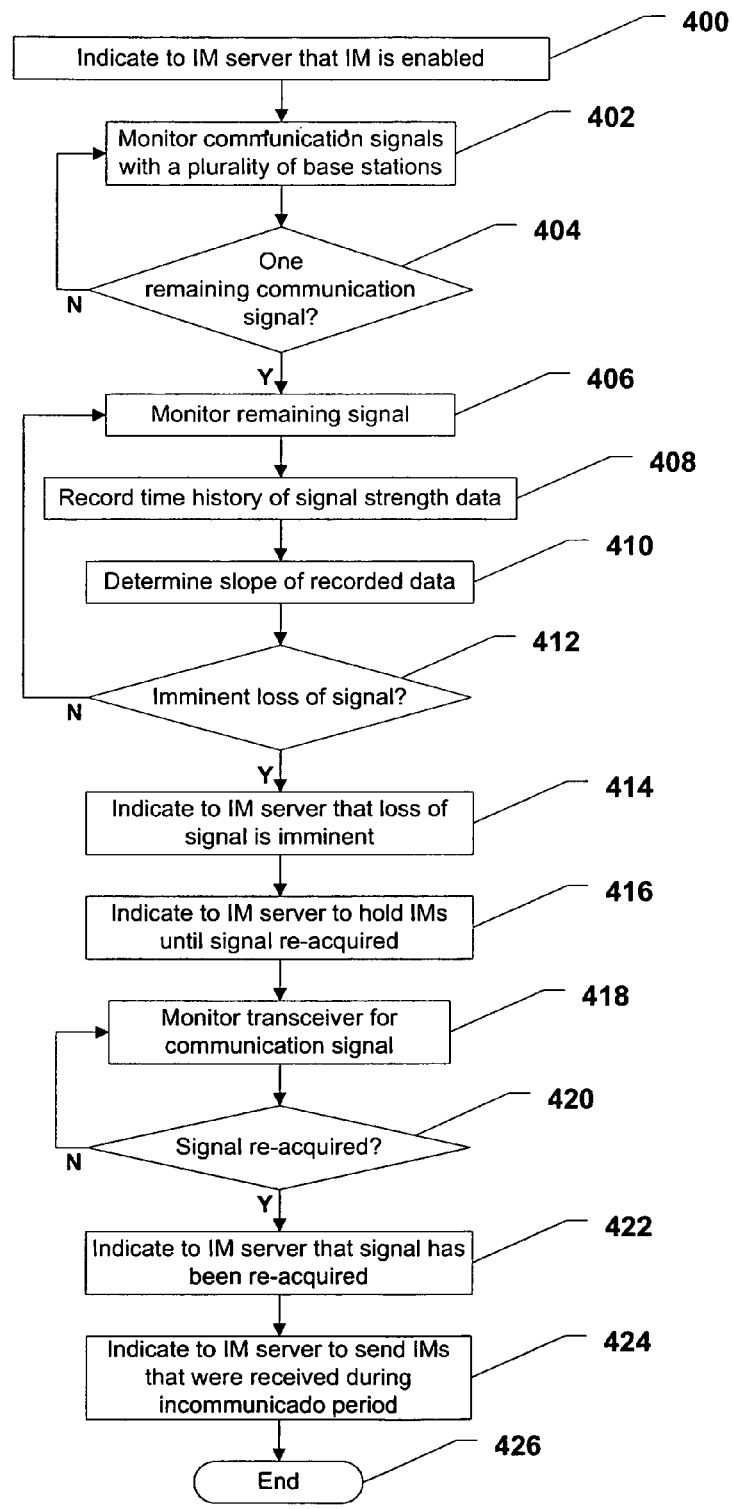
FIG. 4 is a flow chart illustrating a method of instant messaging.
Figure 5:
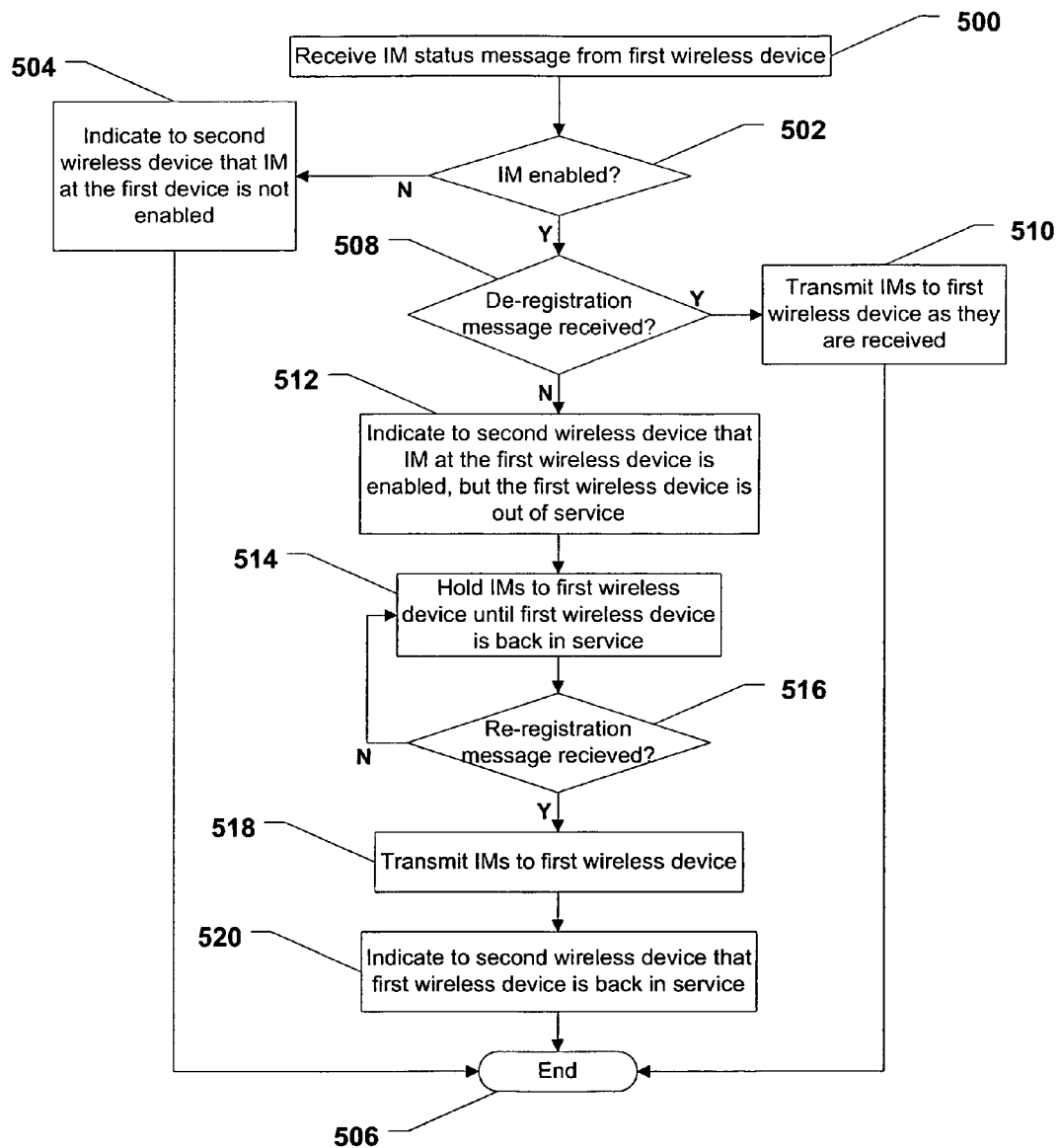
FIG. 5 is a flow chart illustrating an alterative method of instant messaging.
Figure 6:
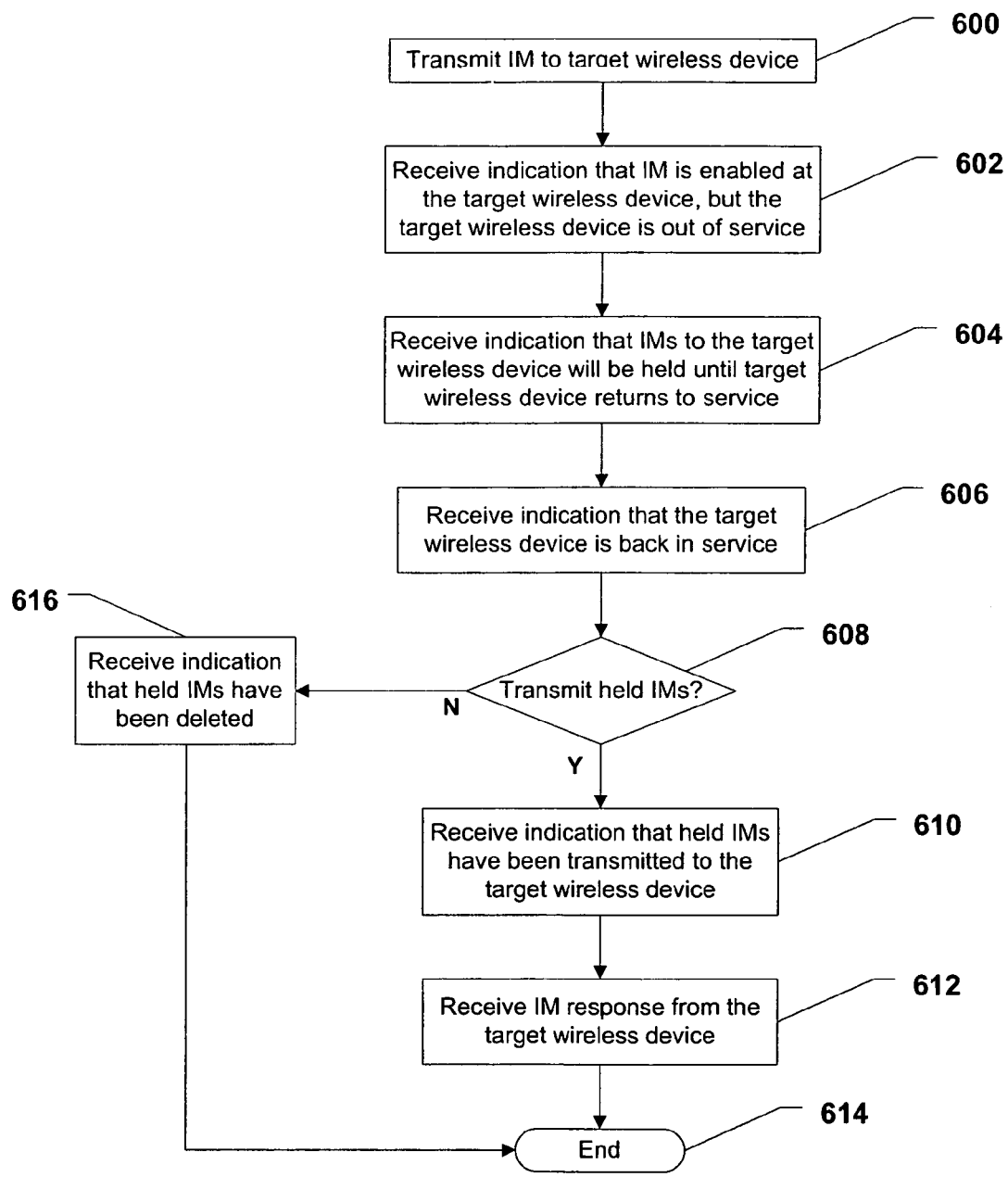
FIG. 6 is a flow chart illustrating another alternative method of instant messaging.

As illustrated in FIG. 3, the instant messaging server 302 can include a processor 310 and a computer readable medium 312, e.g., a memory, that is accessible to the processor 312. In a particular embodiment, a computer program 314 is embedded within the computer readable medium 312 and can be used to control instant messaging between the wireless devices 304, 306. More particularly, when either wireless device 304, 306 transmits a de-registration message to the instant messaging server 302 that indicates that the wireless device 304, 306 is experiencing an imminent loss of service condition or imminent loss of signal condition, the instant messaging server 302 can hold instant messages to the wireless device 304, 306 until the wireless device 304, 306 re-acquires a communication signal and returns to service. FIGS. 4 through 6, described in detail below, illustrate exemplary, non-limiting methods that can be used to control instant messaging between the wireless devices 304, 306.

Referring to FIG. 4, a method of instant messaging is shown and commences at block 400. At block 400, a wireless device indicates to an instant messaging server that instant messaging is enabled at the wireless device. Thereafter, at block 402, the wireless device monitors a plurality of communication signals between the wireless device and a plurality of base stations. At block 404, the wireless device determines whether only one communication signal between the wireless device and a base station remains. If not, the method returns to block 402 and continues as described herein. Conversely, if only one communication signal remains, the method proceeds to block 406 and the wireless device monitors the one remaining signal.

Moving to block 408, the wireless device records a time history of signal strength data for the one remaining signal. At block 410, the wireless device determines the slope of the recorded data. Next, at decision step 412, the wireless device determines whether the wireless device is experiencing an imminent loss of signal. In a particular embodiment, the wireless device determines whether the wireless device is about to lose the one remaining signal based on the slope of the recorded data. In other words, if the slope is relatively steep and downward, the wireless device is experiencing an imminent loss of signal.

At decision step 412, if the wireless device is not experiencing an imminent loss of signal, the method returns to block 406 and continues as described herein. On the other hand, if the wireless device is experiencing an imminent loss of signal, the method continues to block 414 and the wireless device indicates to the instant messaging server that a loss of signal, or connection, is about to occur. Proceeding to block 416, the wireless device indicates to the instant messaging server to hold instant messages to the wireless device until a communication signal is re-acquired by the wireless device.

Moving to block 418, the wireless device monitors a transceiver within the wireless device for a communication signal. At decision step 420, the wireless device determines whether the transceiver within the wireless device has re-acquired a communication signal. If the wireless device has not re-acquired a signal, the method returns to block 418 and continues as described herein. Otherwise, if a signal is re-acquired, the method continues to block 422 and the wireless device indicates to the instant messaging server that a communication signal has been re-acquired. At block 424, the wireless device indicates to the instant messaging server to send instant messages to the wireless device that were received at the instant messaging server and held while the wireless device was incommunicado. The method then ends at state 426.

FIG. 5 illustrates an alternative method of instant messaging. Beginning at block 500, an instant messaging server receives an instant messaging status message from a first wireless device. At decision step 502, the instant messaging server determines whether instant messaging is enabled at the wireless device based on the instant messaging status message. If instant messaging is not enabled at the wireless device, the method proceeds to block 504 and the instant messaging server indicates to a second wireless device that instant messaging is not enabled at the first wireless device. The method then ends at state 506.

Returning to decision step 502, if instant messaging is enabled at the first wireless device, the method proceeds to decision step 508 and the instant messaging server determines whether a de-registration message is received at the instant messaging server from the first wireless device. In a particular embodiment, the de-registration message indicates to the instant messaging server that the first wireless device is experiencing an imminent loss of signal condition and that the first wireless device is about to lose a communication signal and go out of service. At decision step 508, if the de-registration message is not received at the instant messaging server from the first wireless device, the method proceeds to block 510 and the instant messaging server transmits instant messages to the first wireless device as the instant messages are received at the instant messaging server, e.g., from the second wireless device. The method then ends at state 506.

Returning to decision step 508, when the de-registration message is received from the first wireless device, the method proceeds to block 512 and the instant messaging server indicates to the second wireless device that instant messaging is enabled at the first wireless device, but the first wireless device is out of service. Thereafter, at block 514, the instant messaging server holds all instant messages to the first wireless device until the first wireless device is back in service.

Moving to decision step 516, the instant messaging server determines whether a re-registration message is received from the first wireless device. If a re-registration message is not received, the method returns to block 514 and continues as described herein. Conversely, when a re-registration message is received, the method proceeds to block 518 and the instant messaging server transmits instant messages to the first wireless device. In an illustrative embodiment, the instant messages transmitted to the first wireless device include the instant messages that were held at the instant messaging server while the first wireless device was incommunicado.

Proceeding to block 520, the instant messaging server indicates to the second wireless device that the first wireless device is back in service. The method then ends at state 506. In a particular embodiment, the first wireless device can be a target wireless device, i.e., a wireless device to which one or more instant messages are to be sent. Further, in a particular embodiment, the second wireless device can be a sending wireless device, i.e., a wireless device from which one or more instant messages are sent.

Referring to FIG. 6, another alternative method of instant messaging is shown and begins at block 600, wherein a sending wireless device transmits an instant message to a target wireless device. At block 602, the sending wireless device receives an indication from an instant messaging server that instant messaging is enabled at the target wireless device, but the target wireless device is out of service. Moving to block 604, the sending wireless device receives an indication from the instant messaging server that instant messages to the target wireless device will be held at the instant messaging server until the target wireless devices returns to service.

At block 606, the sending wireless device receives an indication from the instant messaging server that the target wireless device has returned to service. Moving to decision step 608, the user of the sending wireless device is queried as to whether the user wishes to transmit the held instant messages to the target wireless device. If the user of the sending wireless device answers yes to the query, the method proceeds to block 610 and the sending wireless device receives an indication from the instant messaging server that the instant messages that were held at the instant messaging server have been transmitted to the target wireless device. At block 612, the sending wireless device receives an instant message response from the target wireless device. Then method then ends at state 614.

Returning to decision step 608, if the user of the sending wireless device answers no to the query, the method proceeds to block 616 and the sending wireless device receives an indication that the held instant messages have been deleted. The method then ends at state 614.

Figure 7:
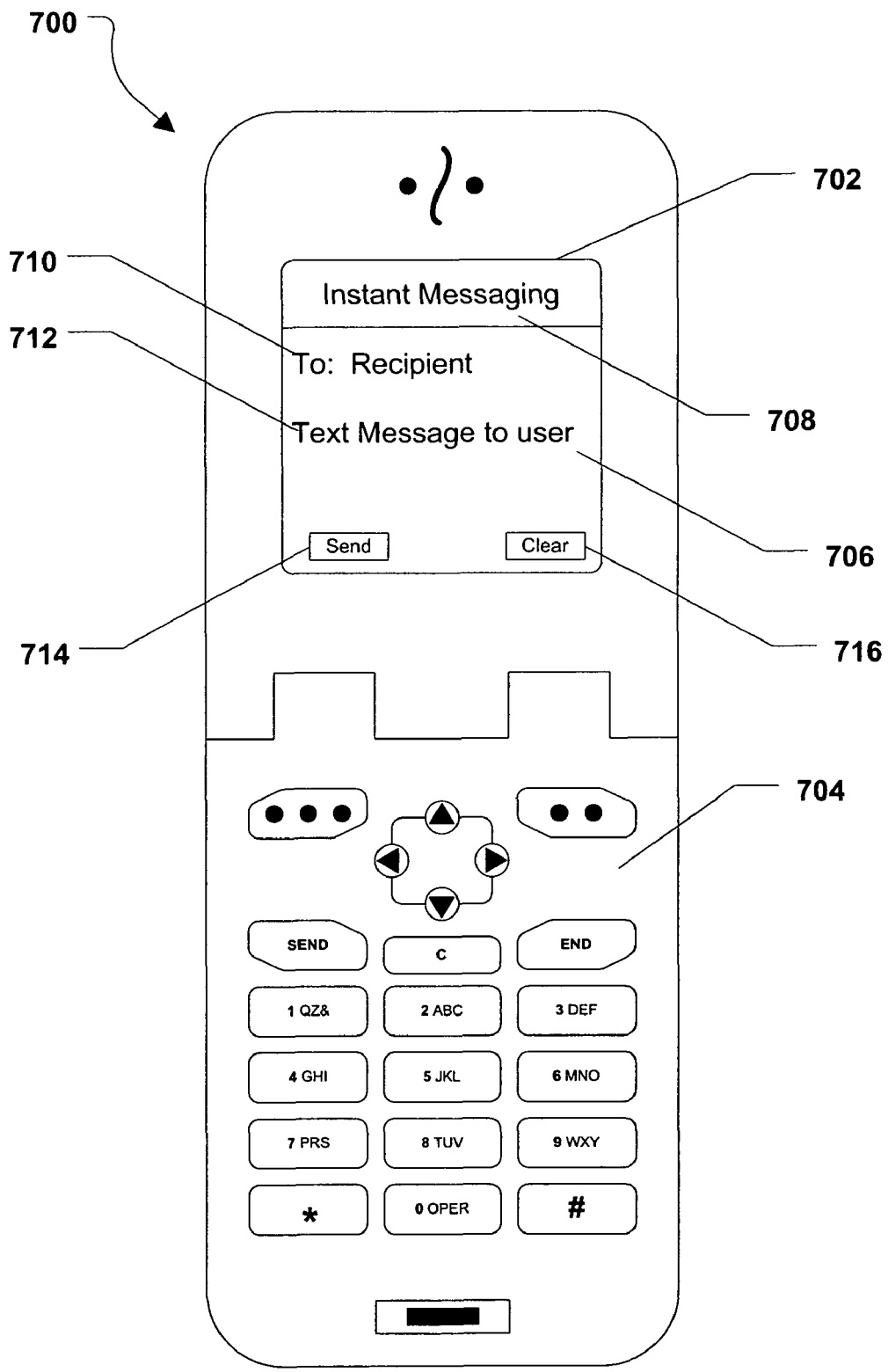
FIG. 7 is a diagram of a wireless device showing an instant messaging graphical user interface.

Referring to FIG. 7, a wireless device is shown and is generally designated 700. As shown, the wireless device 700 includes a display 702 and a keypad 704. FIG. 7 further illustrates an instant messaging graphical user interface (GUI) 706 that can be presented to a user via the display 702 of the wireless device 700. As shown, the instant messaging GUI 706 can include a screen header 708, a recipient, or target, instant messaging address input field 710, and a text message input field 712. In a particular embodiment, a user of the wireless device 700 can input an instant messaging address the text message 710. Additionally, a user of the wireless device 700 can input an instant messaging to the text message input field 712.

As depicted in FIG. 7, the instant messaging GUI 706 can also include a send soft button 714 and a clear soft button 716. In a particular embodiment, can toggle the send soft button 714 in order to transmit an instant message within the text message input field 712 to an instant messaging server. The instant messaging server, in turn, can forward the instant message to the instant messaging address within the instant messaging address input field 710. In a particular embodiment, a user can clear the fields 710, 712 by toggling the clear soft button 716.

Figure 8:
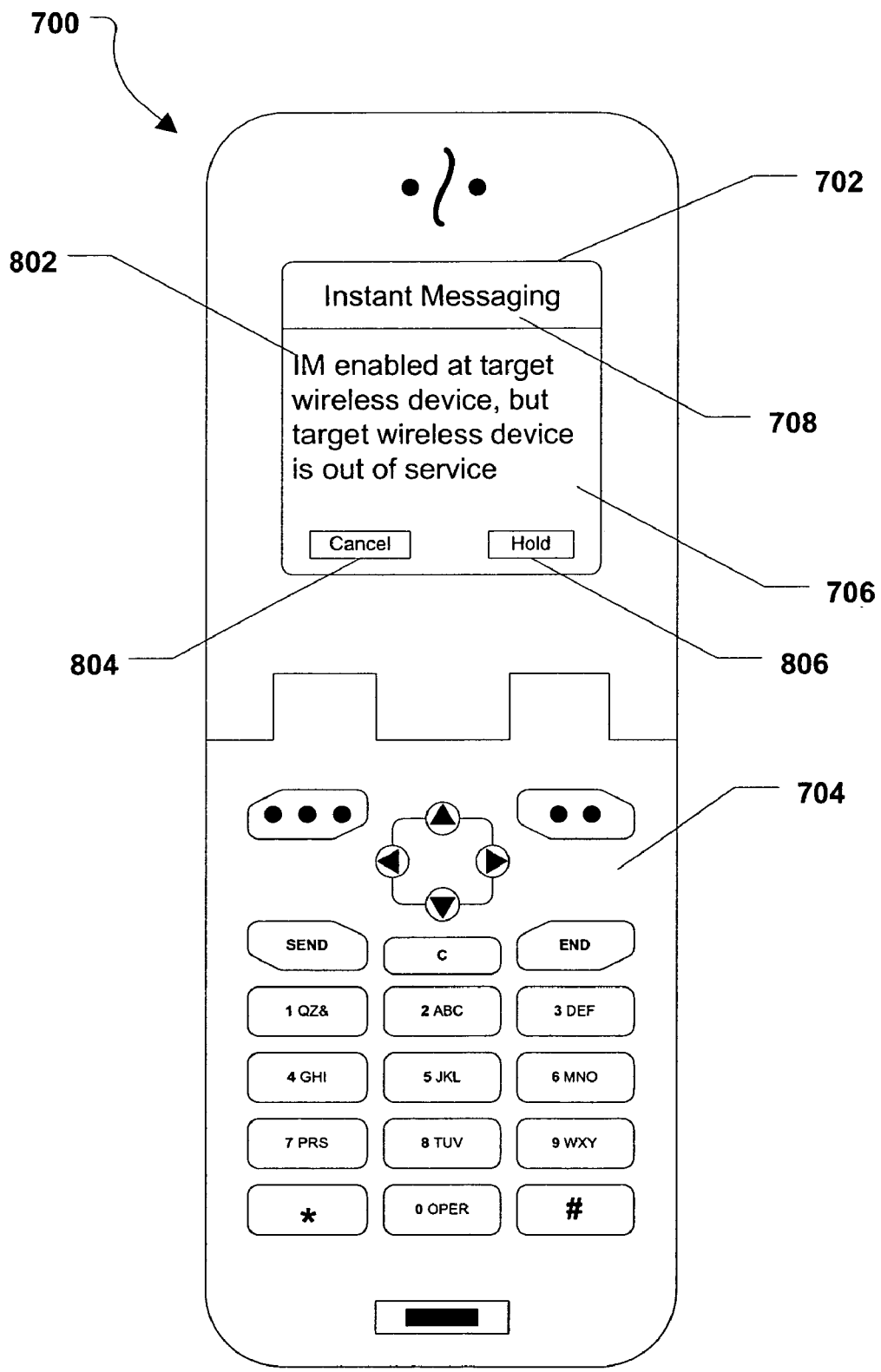
FIG. 8 is a diagram of a wireless device showing an instant messaging graphical user interface.

FIG. 8 indicates that the instant messaging GUI 706 can also include a first message 802 that can indicate that, "IM is enabled at the target wireless device, but target wireless device is out of service." Further, the instant messaging GUI 706 can include a cancel soft button 804 and a hold soft button 806. In a particular embodiment, the cancel soft button 804 can be toggled by a user in order to cancel an instant message to the target wireless device. Also, in a particular embodiment, the hold soft button 806 can be toggled by a user in order to cause the instant messaging server to hold all instant messages to the target wireless device at the instant messaging server.

Figure 9:
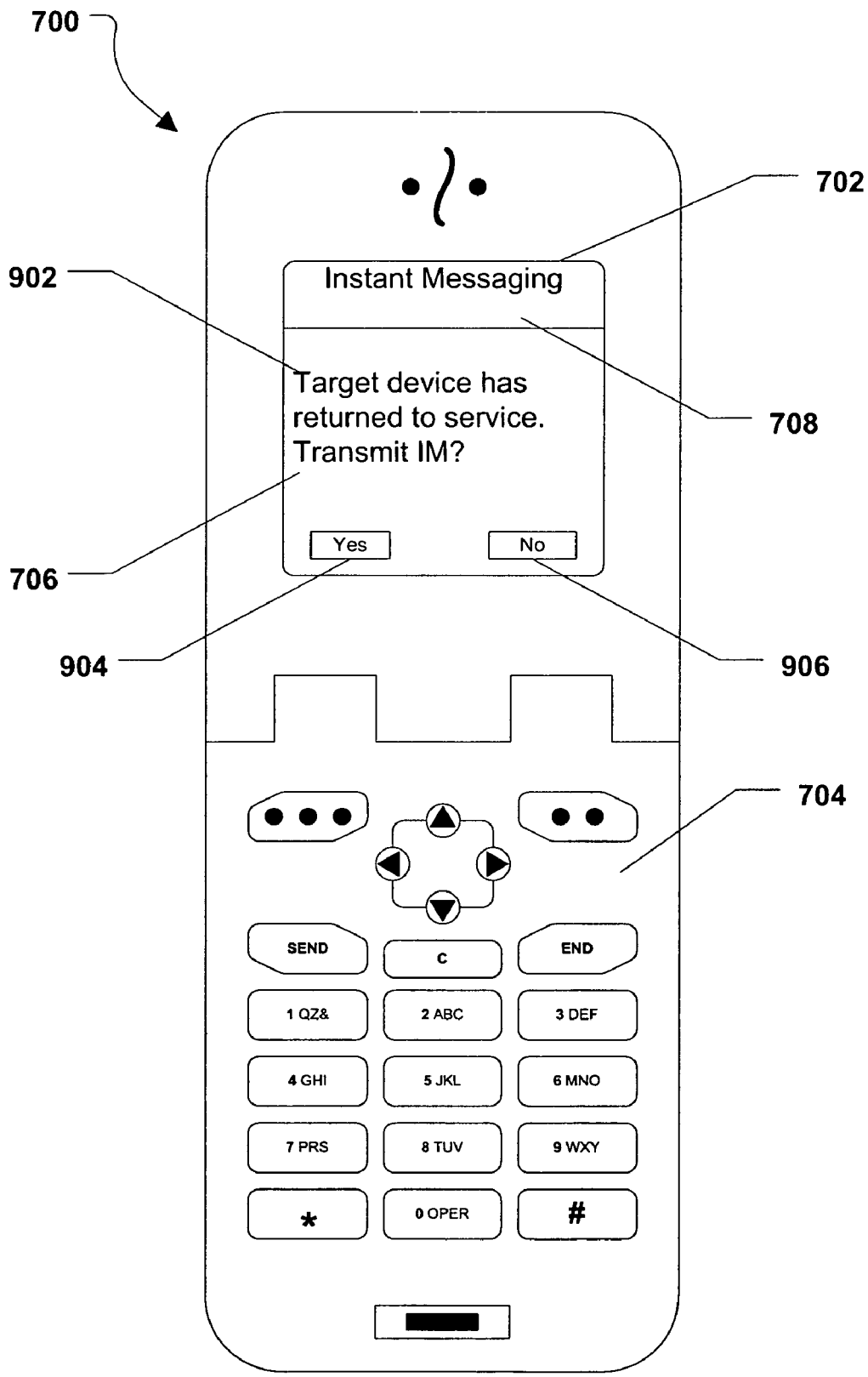
FIG. 9 is a diagram of a wireless device showing an instant messaging graphical user interface.

Referring to FIG. 9, the instant messaging GUI 706 can also include a second message 902 that indicates, "Target device has returned to service. Transmit IM?" As shown, the instant messaging GUI 706 can also include a yes soft button 904 and a no soft button 906. A user can select the yes soft button 904 to transmit any instant messages that have been held at the instant messaging server. Conversely, a user can select the no soft button 906 and the held emails can be deleted at the instant messaging server.

Figure 10:
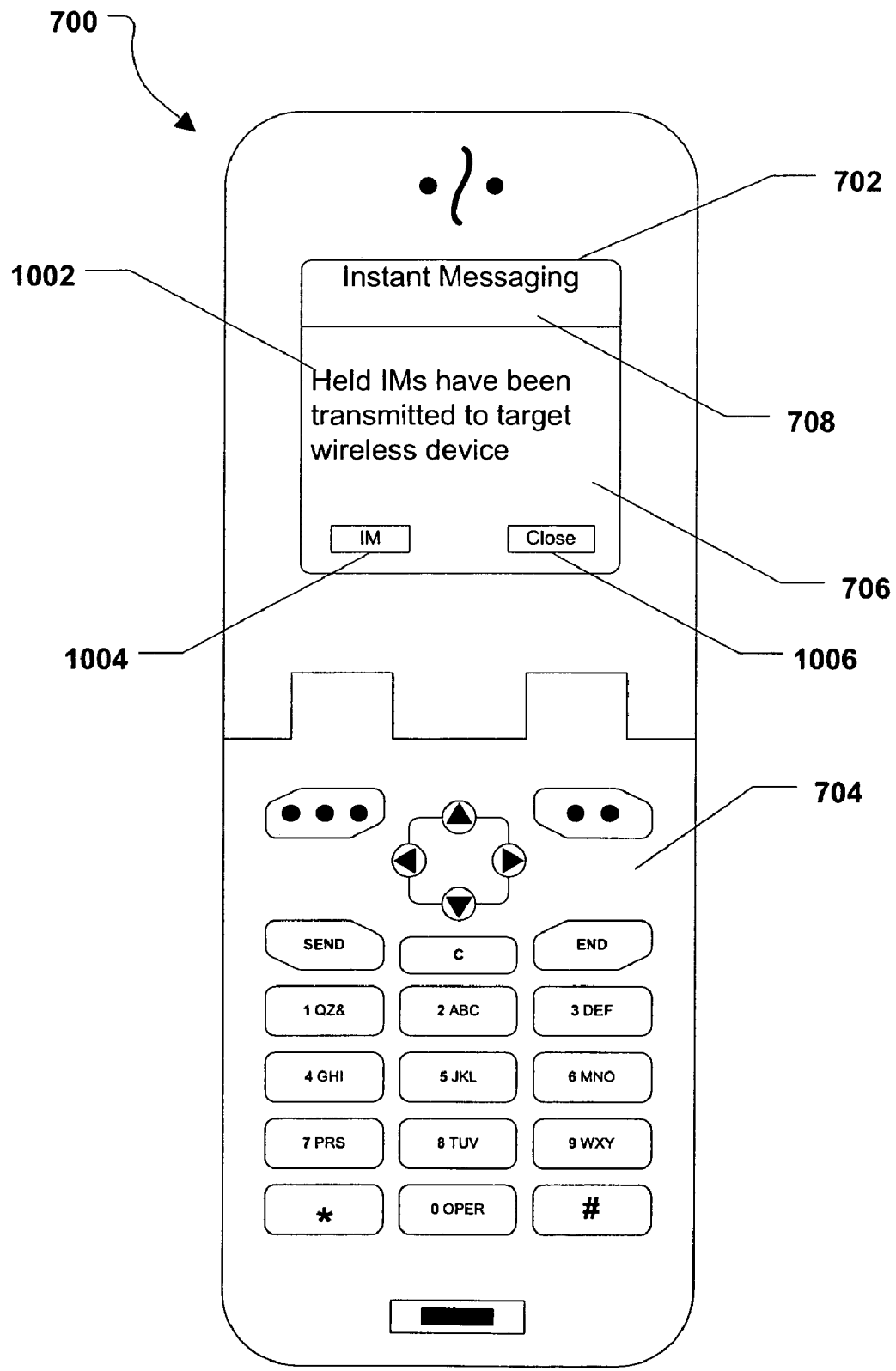
FIG. 10 is a diagram of a wireless device showing an instant messaging graphical user interface.

When the yes soft button 904 is selected, a third message 1002, shown in FIG. 10, can be presented to the user by the instant messaging GUI 706. The third message 1002 can indicate that, "Held IMs have been transmitted to the target wireless device." Further, as illustrated in FIG. 10, the instant messaging GUI 706 can include an IM soft button 1004 and a close soft button 1006. The IM soft button 1004 can return the user to the portion of the instant messaging GUI 706 shown in FIG. 7. On the other hand, the close soft button 1006 can be toggled to close the instant messaging GUI 706.

Figure 11:
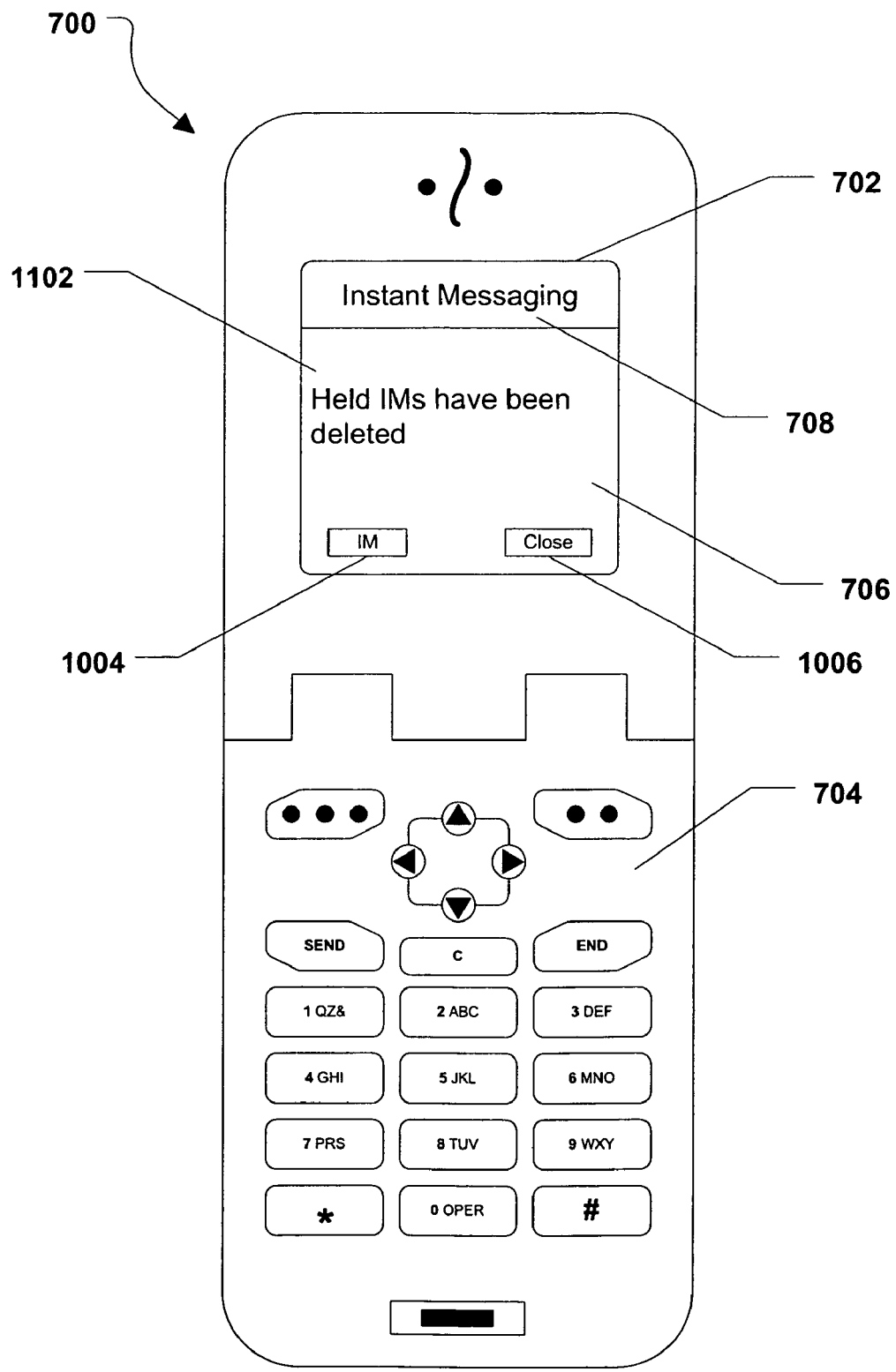
FIG. 11 is a diagram of a wireless device showing an instant messaging graphical user interface.

When the no soft button 906 is selected, a fourth message 1102, shown in FIG. 11, can be presented to the user by the instant messaging GUI 706. In an illustrative embodiment, the fourth message 1102 can indicate to the user that, "Held IMs have been deleted."

With the configuration of structure disclosed herein, the system and method can allow a wireless device to transmit an indication to an instant messaging server that the wireless device is about to experience a loss of signal. As such, other wireless devices that are attempting to transmit instant messages to the wireless device that has lost the communication signal can be informed that the target wireless device has experienced a loss of signal, but wishes to receive instant messages once a signal is re-acquired. Accordingly, a user can continue to transmit instant messages to the target wireless device and an instant messaging server can hold the instant messages for transmission to the target wireless device after the target wireless device indicates that a signal has been re-acquired.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device or a user terminal. In the alternative, the processor and the storage medium may reside as discrete components in a wireless device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of instant messaging between mobile devices, the method comprising:
    transmitting an indication from a wireless device to an instant messaging server that instant messaging is enabled at the wireless device;
    monitoring a plurality of communication signals between the wireless device and a plurality of base stations;
    determining that only one communication signal out of the plurality of communication signals with one of the plurality of base stations remains;
    recording a time history of signal strength data for the only one communication signal; determining a slope of the signal strength data;
    based on the slope of the signal strength data, determining that an imminent loss of signal is about to occur at the wireless device;
    transmitting an indication to the instant messaging server that the wireless device is experiencing an imminent loss of signal condition; and
    transmitting an indication to the instant messaging server to hold instant messages.

2. The method of claim 1, further comprising:
    monitoring the only one remaining communication signal.

3. The method of claim 1, further comprising:
    monitoring the wireless device for a communication signal; and
    determining whether the communication signal is re-acquired.

4. The method of claim 3, further comprising transmitting an indication to the instant messaging server that the communication signal is re-acquired.

5. The method of claim 4, further comprising indicating to the instant messaging server to send instant messages that were received while the wireless device was out of communication with the instant messaging server.

6. A server-based method of instant messaging between mobile devices, comprising:
    receiving an instant messaging status message from a first wireless device at an instant messaging server;
    determining whether instant messaging is enabled at the first wireless device; and determining whether a de-registration message is received from the first wireless device at the instant messaging server and transmitting an indication to a second wireless device that one or more instant messages to a target wireless device will be held at the instant messaging server, wherein the de-registration message indicates that the first wireless device is experiencing an imminent loss of signal condition, and wherein the imminent loss of signal condition is determined by:
    monitoring a plurality of communication signals between the first wireless device and a plurality of base stations;
    determining that only one communication signal out of the plurality of communication signals with one of the plurality of base stations remains;
    recording a time history of signal strength data for the only one communication signal;
    determining a slope of the signal strength data; and
    based on the slope of the signal strength data, determining that an imminent loss of signal is about to occur.

7. The method of claim 6, further comprising indicating to the second wireless device that the first wireless device is out of service.

8. The method of claim 7, further comprising holding instant messages directed to the first wireless device at the instant messaging server after receiving the de-registration message.

9. The method of claim 8, further comprising determining whether a re-registration message is received from the first wireless device at the instant messaging server, wherein the re-registration message indicates that the first wireless device is back in service.

10. The method of claim 9, further comprising transmitting one or more held instant messages from the instant messaging server to the first wireless device, wherein the one or more held instant messages were received at the instant messaging server after receiving the de-registration message.

11. The method of claim 10, further comprising indicating to a second wireless device that the first wireless device is back in service.

12. A server-based method of instant messaging between mobile devices, comprising:
    receiving, at an instant messaging server, one or more instant messages from a sending wireless device and transmitting the one or more instant messages to a target wireless device;

monitoring, by the instant messaging server, a plurality of communication signals between the target wireless device and a plurality of base stations;

determining, by the instant messaging server, that only one communication signal out of the plurality of communication signals with one of the plurality of base stations remains;

recording a time history of signal strength data for the only one communication signal;

determining a slope of the signal strength data; and based on the slope of the signal strength data, determining that an imminent loss of signal is about to occur determining, by the instant messaging server, that the target wireless device is out of service;

transmitting, by the instant messaging server, an indication to the sending wireless device that instant messaging is enabled at the target wireless device and that the target wireless device is out of service; and transmitting an indication to the sending wireless device that one or more instant messages to the target wireless device will be held at the instant messaging server.

13. The method of claim 12, further comprising receiving an indication at the sending wireless device that the target wireless device has returned to service.

14. The method of claim 13, further comprising receiving an indication at the sending wireless device that one or more instant messages that were held at the instant messaging server have been transmitted to the target wireless device.

15. The method of claim 14, further comprising receiving one or more instant messaging responses from the target wireless device at the sending wireless device.

16. A communication system, comprising:
a first wireless device;
a second wireless device;
an instant messaging server coupled to the first wireless device and the second wireless device, the instant messaging server comprising:
a processor; a computer readable medium accessible to the processor; and
a computer program embedded within the computer readable medium, the computer program comprising:
instructions to receive an instant messaging status message from a first wireless device;
instructions to determine whether instant messaging is enabled at the first wireless device; and
instructions to determine whether a de-registration message is received from the first wireless device and transmitting an indication to a second wireless device that one or more instant messages to the first wireless device will be held at the instant messaging server, wherein the deregistration message indicates that the first wireless device is experiencing an imminent loss of signal condition and that the first wireless device is about to go out of service, and wherein the imminent loss of signal condition is determined by:
monitoring a plurality of communication signals between the wireless device and a plurality of base stations;
determining that only one communication signal out of the plurality of communication signals with one of the plurality of base stations remains; recording a time history of signal strength data for the only one communication signal;
determining a slope of the signal strength data; and
based on the slope of the signal strength data, determining that an imminent loss of signal is about to occur.

17. A wireless device, comprising:
a processor; a computer readable medium accessible to the processor; and a computer program embedded within the computer readable medium, the computer program comprising: instructions to transmit an indication from a wireless device to an instant messaging server that instant messaging is enabled at the wireless device; and
instructions to monitor a plurality of communication signals between the wireless device and a plurality of base stations;
instructions to determine that only one communication signal out of the plurality of communication signals with one of the plurality of base stations remains;
instructions to record a time history of signal strength data for the only one communication signal;
instructions to determine a slope of the signal strength data; based on the slope of the signal strength data, instructions to transmit an indication of an imminent loss of signal condition;
transmitting an indication to the instant messaging server that the wireless device is experiencing an imminent loss of signal condition; and
transmitting an indication to the instant messaging server to hold instant messages.

18. An instant messaging server, comprising:
a processor;
a computer readable medium accessible to the processor; and
a computer program embedded within the computer readable medium, the computer program comprising:
instructions to receive an instant messaging status message from a first wireless device;
instructions to determine whether instant messaging is enabled at the first wireless device; and
instructions to determine whether a de-registration message is received from the first wireless device and transmitting an indication to a second wireless device that one or more instant messages to the first wireless device will be held at the instant messaging server, wherein the de-registration message indicates that the first wireless device is experiencing an imminent loss of signal condition, and wherein the imminent loss of signal condition is determined by:
monitoring a plurality of communication signals between the wireless device and a plurality of base stations;
determining that only one communication signal out of the plurality of communication signals with one of the plurality of base stations remains;
recording a time history of signal strength data for the only one communication signal;
determining a slope of the signal strength data; and
based on the slope of the signal strength data, determining that an imminent loss of signal is about to occur.

19. A wireless device, comprising:
a processor;
a computer readable medium accessible to the processor; and
a computer program embedded within the computer readable medium, the computer program comprising:
instructions to transmit one or more instant messages to a target wireless device via an instant messaging server;
instructions to receive an indication from the instant messaging server that instant messaging is enabled at the target wireless device and that the target wireless device is out of service, wherein the target wireless device is determined to be out of service by:

monitoring a plurality of communication signals between the target wireless device and a plurality of base stations;
determining that only one communication signal out of the plurality of communication signals with one of the plurality of base stations remains;
recording a time history of signal strength data for the only one communication signal;
determining a slope of the signal strength data; and
based on the slope of the signal strength data, determining that an imminent loss of signal is about to occur;
transmitting an indication to the instant messaging server that the target wireless device is experiencing an imminent loss of signal condition; and
instructions to receive an indication that one or more instant messages to the target wireless device will be held at the instant messaging server.

20. A computer program embedded within a non-transitory computer readable medium, the computer program comprising:
instructions to receive an instant messaging status message from a first wireless device at an instant messaging server;
instructions to determine whether instant messaging is enabled at the first wireless device; and
instructions to determine whether a de-registration message is received from the first wireless device at the instant messaging server and transmit an indication to a second wireless device that one or more instant messages to the first wireless device will be held at the instant messaging server, wherein the deregistration message indicates that the first wireless device is experiencing an imminent loss of signal condition, and wherein the imminent loss of signal condition is determined by;
monitoring a plurality of communication signals between the first wireless device and a plurality of base stations;
determining that only one communication signal out of the plurality of communication signals with one of the plurality of base stations remains;
recording a time history of signal strength data for the only one communication signal;
determining a slope of the signal strength data; and
based on the slope of the signal strength data, determining that an imminent loss of signal is about to occur.

21. A computer program embedded within a non-transitory computer readable medium, the computer program comprising:
instructions to transmit an indication from a wireless device to an instant messaging server that instant messaging is enabled at the wireless device;
instructions to monitor a plurality of communication signals between the wireless device and a plurality of base stations;
instructions to determine that only one communication signal out of the plurality of communication signals with one of the plurality of base stations remains;
instructions to record a time history of signal strength data for a communication signal;
instructions to determine a slope of the signal strength data;
based on the slope of the signal strength data, instructions to determine that an imminent loss of signal is about to occur at the wireless device;
instructions to transmit an indication to the instant messaging server that the wireless device is experiencing an imminent loss of signal condition; and
instructions to transmit an indication to the instant messaging server to hold instant messages.

22. A computer program embedded within a non-transitory computer readable medium, the computer program comprising:
instructions to transmit one or more instant messages from a sending wireless device to a target wireless device via an instant messaging server;
instructions to receive an indication at the sending wireless device from the instant messaging server that instant messaging is enabled at the target wireless device and that the target wireless device is out of service, wherein the target wireless device is determined to be out of service by:
monitoring a plurality of communication signals between the target wireless device and a plurality of base stations;
determining that only one communication signal out of the plurality of communication signals with one of the plurality of base stations remains;
recording a time history of signal strength data for the only one communication signal;
determining a slope of the signal strength data; and
based on the slope of the signal strength data, determining that an imminent loss of signal is about to occur; and
instructions to receive an indication at the sending wireless device from the instant messaging server that one or more instant messages to the target wireless device will be held at the instant messaging server.

23. An instant messaging server, comprising:
means for receiving an instant messaging status message from a first wireless device;
means for determining whether instant messaging is enabled at the first wireless device; and
means for receiving a de-registration message,
means for transmitting an indication to a second wireless device that one or more instant messages to a target wireless device will be held at the instant messaging server, wherein the de-registration message indicates that the first wireless device is experiencing an imminent loss of signal condition and the first wireless device is about to go out of service and wherein the imminent loss of signal condition is determined by:
monitoring a plurality of communication signals between the target wireless device and a plurality of base stations;
determining that only one communication signal out of the plurality of communication signals with one of the plurality of base stations remains;
recording a time history of signal strength data for the only one communication signal;
determining a slope of the signal strength data; and
based on the slope of the signal strength data, determining that an imminent loss of signal is about to occur.

24. A wireless device, comprising:
means for transmitting an indication from a wireless device to an instant messaging server that instant messaging is enabled at the wireless device; and
means for monitoring a plurality of communication signals between the wireless device and a plurality of base stations;
means for determining that only one communication signal out of the plurality of communication signals with one of the plurality of base stations remains;
means for recording a time history of signal strength data for the only one communication signal;
means for determining a slope of the signal strength data;
means for determining that an imminent loss of signal is about to occur at the wireless device based on the slope of the signal strength data;

means for transmitting an indication to the instant messaging server that the wireless device is experiencing an imminent loss of signal condition; and means for transmitting an indication to the instant messaging server to hold instant messages.

25. A wireless device, comprising:

means for transmitting one or more instant messages to a target wireless device via an instant messaging server;

means for receiving an indication from the instant messaging server that instant messaging is enabled at the target wireless device and that the target wireless device is out of service, wherein the target wireless device is determined to be out of service by:

monitoring a plurality of communication signals between the target wireless device and a plurality of base stations;

determining that only one communication signal out of the plurality of communication signals with one of the plurality of base stations remains;

recording a time history of signal strength data for the only one communication signal;

determining a slope of the signal strength data; and based on the slope of the signal strength data, determining that an imminent loss of signal is about to occur;

transmitting an indication to the instant messaging server that the target wireless device is experiencing an imminent loss of signal condition; and means for receiving an indication that one or more instant messages to the target wireless device will be held at the instant messaging server.

* * * * *